United States Patent [19]

Daden

[11] Patent Number: 5,366,745
[45] Date of Patent: Nov. 22, 1994

[54] LOW PRESSURE BEVERAGE CARBONATOR USING A CHEMICAL SOURCE OF CARBON

[76] Inventor: William G. Daden, 10631 Taupe St., Alta Loma, Calif. 91701

[21] Appl. No.: 166,318

[22] Filed: Dec. 10, 1993

Related U.S. Application Data

[63] Continuation of Ser. No. 963,746, Oct. 20, 1992.

[51] Int. Cl.$^5$ ............................................. B01F 3/04
[52] U.S. Cl. ................................. 426/477; 99/323.1; 261/DIG. 7
[58] Field of Search ........................... 99/323.1, 323.2; 261/DIG. 7; 426/477, 561, 551, 591; 422/112, 236, 238, 237, 305

[56] References Cited

U.S. PATENT DOCUMENTS

| | | | |
|---|---|---|---|
| 20,382 | 5/1858 | Wheeler | 99/323.1 |
| 705,570 | 7/1902 | Feldkamp | 99/323.1 |
| 2,591,990 | 10/1948 | Wisdom | 261/121 |
| 3,476,520 | 11/1969 | Hovey | 23/282 |
| 3,492,671 | 1/1970 | Hovey | 99/275 |
| 4,040,342 | 8/1977 | Austin et al. | 99/323.1 |
| 4,475,448 | 10/1984 | Shoaf et al. | 99/323.1 |
| 4,481,986 | 11/1984 | Meyers | 99/323.2 |
| 4,494,452 | 1/1985 | Barzso | 99/323.1 |
| 4,526,730 | 7/1985 | Cochran et al. | 99/323.1 |
| 4,636,337 | 1/1987 | Gupta et al. | 99/323.1 |
| 5,154,112 | 10/1992 | Wettern | 99/323.1 |

OTHER PUBLICATIONS

Invention Disclosure—Low Pressure Beverage Carbonator, W. G. Daden Mailed 6th Oct., 1992—No acknowledgement received to date.

*Primary Examiner*—Timothy F. Simone
*Assistant Examiner*—Reginald L. Alexander

[57] ABSTRACT

Apparatus for the low pressure carbonation of beverages by the consumer using a chemical source of carbon dioxide. Low carbonation pressures are achieved by significantly reducing the rate of carbon dioxide gas generation when compared to prior art carbonators. Carbon dioxide is generated by a chemical or chemical combination which will react with water, but does not significantly react when said water is frozen. Embodiment described uses chemical combination of edible acid, carbonate and ice. Reaction occurs gradually when ice slowly reverts to a liquid state. Carbon dioxide is generated in carbonation chamber (10). Gas passes through carbonator cap (12) and into the beverage contained within beverage vessel (16) thus causing carbonation. Chamber (10), cap (12) and beverage vessel (16) are all connected by gas tight means.

1 Claim, 5 Drawing Sheets

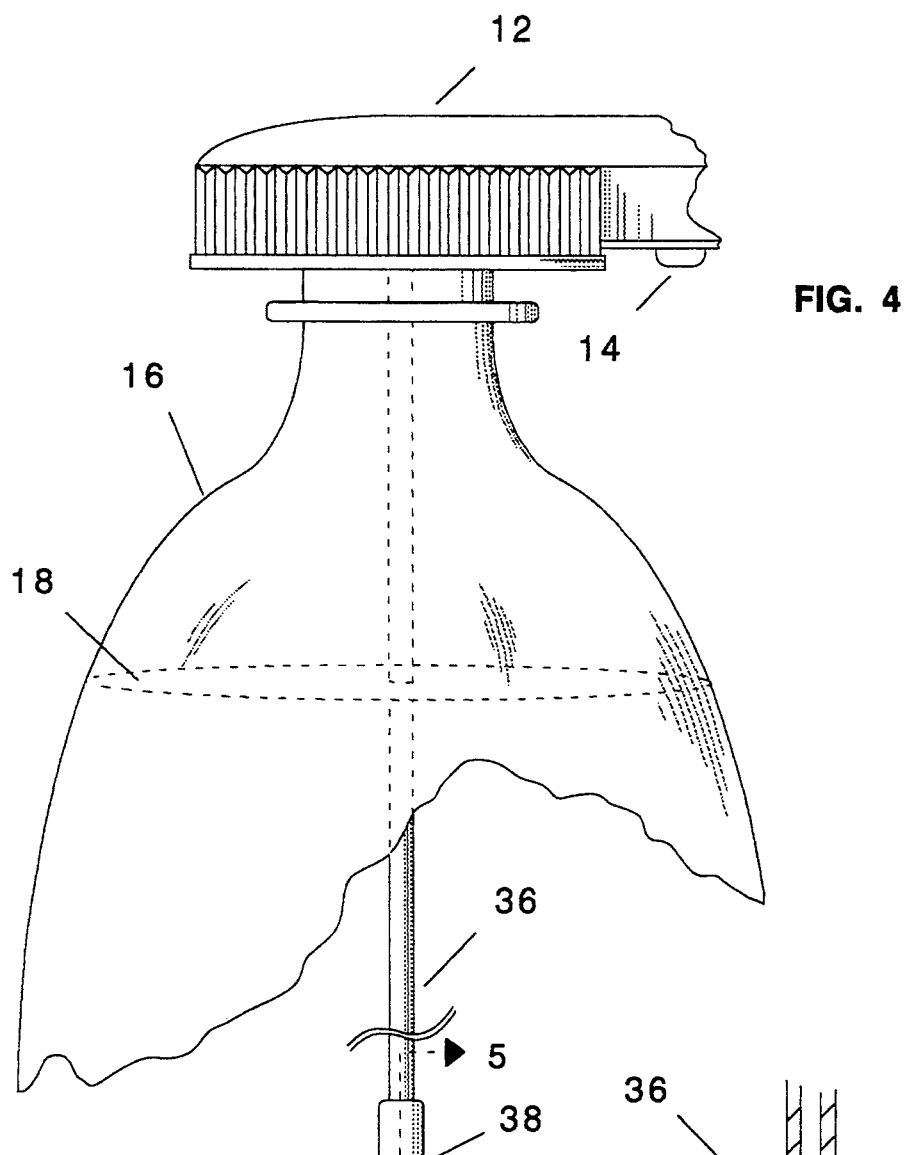
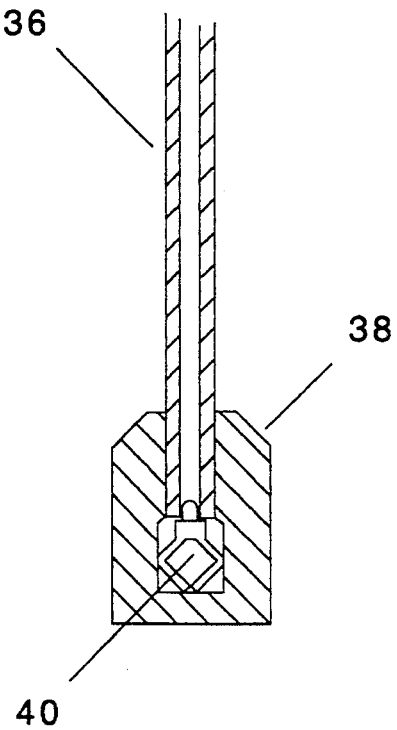
FIG. 4
FIG. 5

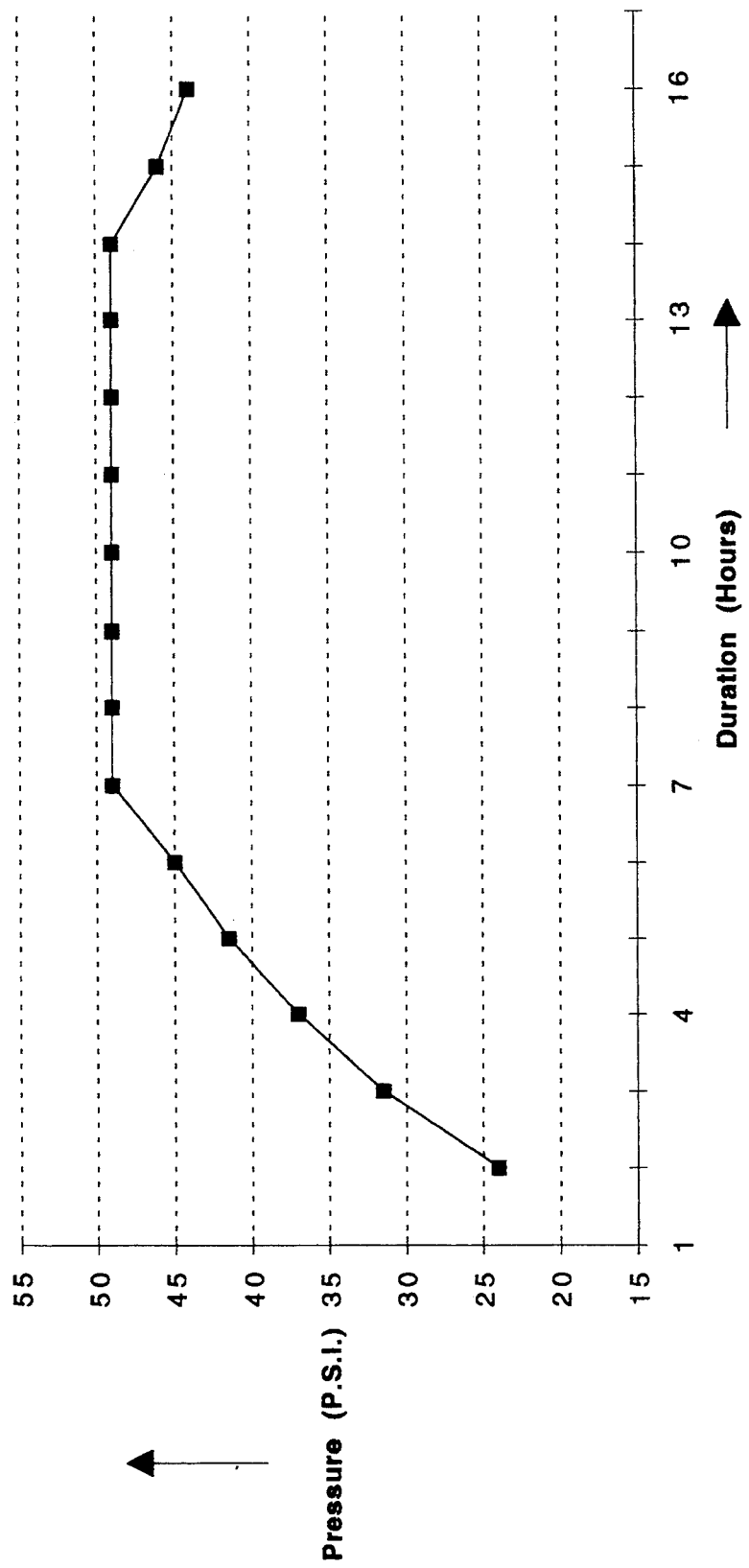
FIG.7 - Approximate Carbonator Performance Curve At 5° Celsius

LOW PRESSURE BEVERAGE CARBONATOR USING A CHEMICAL SOURCE OF CARBON

BACKGROUND

This application is a continuation of application Ser. No. 07/963,746 filed Oct. 20, 1992, now abandoned.

1. Field of Invention

This invention relates to the carbonation of beverages. Specifically to the carbonation of beverages at home, by the consumer, using a chemical source of carbon dioxide.

2. Description of Prior Art

The disposable two liter plastic soda bottle is a considerable feat of engineering. It is a vessel weighing approximately 50 grammes, capable of withstanding pressures of 100 P.S.I. without significant permanent distortion. Despite this, the average life span of this commonly used container is unnecessarily short. Once manufactured, the vessel is transported to a bottling company where it is filled with a carbonated beverage. From there it is delivered to one of many retail outlets for public consumption. Once purchased, the beverage is quickly consumed and the container is either discarded or recycled. Recycling technology is not sufficiently refined to once again manufacture a product of similar quality to that of the original bottle. Even if recycling were to become the norm, the manufacturing process described above is both expensive, energy intensive and a nett consumer of natural resources. By walking into any grocery store and observing the amount of shelf space allotted to carbonated beverages, we are quickly reminded that the proliferation of the plastic bottle has reached epidemic proportions. Furthermore, when consumed in quantity, these beverages are not cheap. In some cases the consumer can pay up to a dollar for a single two liter bottle of simple carbonated water.

A solution to the problems of both cost and reusability is to produce a device which will permit the consumer to carbonate the beverage of choice at home. Although well recorded in prior art, home carbonation using a chemical source of carbon dioxide has not achieved lasting commercial success, despite the low cost of suitable chemicals. To more fully understand this failure to gain commercial acceptability, one must first anticipate a minimum standard of performance for such a device and then apply this to a discussion of the prior art.

To be commercially viable, a carbonator must operate at a maximum pressure which is consistent with safe use in the home environment. The higher the pressure, the greater the probability that the device will be rendered unmarketable by product liability constraints. Conversely, to manufacture a device capable of safely withstanding the pressures evidenced in most relevant prior art, would be expensive and appeal to a much smaller sector of the public now consuming carbonated beverages.

The health conscious public of today is more concerned than ever with the chemical constituents of beverages. A number of years ago, when effervescent beverage powders achieved some commercial success, it was customary to accept the inclusion of edible carbonation chemicals and the products of reaction in the actual beverage to be consumed. Ingestion of such chemicals would be unappealing to the modern consumer when the alternative is a relatively pure beverage containing barely detectable traces of such chemicals. Accordingly, to achieve commercial success the device should substantially preclude the unwanted solid, liquid and gaseous products of reaction from entering the beverage to be consumed. The device must also be simple to use and relatively cheap to manufacture if it is to be commercially viable on today's market. The beverage produced must also have a quality of carbonation similar to that now available.

Unfortunately, edible chemicals most appropriate to the carbonation process frustrate these criteria significantly. For example a commonly used combination of citric acid and baking soda, when in contact with water will react vigorously. Such reaction results in either the generation of significant pressures within a carbonation system, or the wasteful venting of gas to the atmosphere through relief valves. Furthermore, such a rate of reaction creates a significant volume of effervescent foaming which will cause both chemical and products of reaction to be suspended in the gas stream and ultimately carried over to the beverage to be carbonated.

The above characteristics of the carbonation chemical were appreciated in Wheeler (U.S. Pat. No. 20,382—May, 1858). A somewhat controlled generation of carbon dioxide is achieved by exposing only a portion of the chemical to water during the initial stages of reaction. The bulk of the chemical is then consumed over time by a process of moisture migration toward the dry portion of chemical. The text of this document states that such a reaction "prevents effervescence except in a very small degree and thus renders the use of washers to purify the gas unnecessary, as nothing can be carried off with the pure gas" ( Ref Page 2, line 23). However the structure of the device and means of charging the container is somewhat complex thus limiting its commercial viability. Due to the hygroscopic nature of the chemical, direct contact with water in the initial stages of reaction will still promote a relatively fast rate of gas generation when compared to the invention described herein.

Feldkamp (U.S Pat. No. 705,570—Jul., 1902) advocates pressure stabilization by a relatively complex device which controls the volume of gas generated by attempting the separation of chemical and water when the appropriate pressure has been achieved. Experimentation has revealed that, even after separation of chemical and water, significant gas generation still occurs. Accordingly, such an imprecise method of pressure stabilization is more appropriate to larger quantities of beverage where excess gas may be more readily absorbed.

Referring now to Wisdom (U.S. Pat. No. 2,591,990—Oct., 1948) where no attempt is made to regulate the rate of reaction. No reference is made to operating pressure in the text of this document. However as the design requires chemical pellets to be dropped into a measured quantity of water it is safe to assume that the rate of reaction is rapid. Considering the chemicals specified (col. 2 line 47) and the embodiment illustrated, it is most likely that the reaction would be sustained for only a few minutes causing pressures well in excess of 100 P.S.I. This assumption is supported by the inclusion of a housing shell in the design which appears to be for the sole purpose of either strengthening the glass bottle or minimizing the effects of an explosion.

Referring now to Hovey (U.S. Pat. No. 3,476,520—Nov., 1969). A specific object of this invention is "provision of such apparatus enabling high speed reaction of the chemicals contained therein" (col. 2 line 25). Furthermore reaction time is stated as being 30 seconds (col. 2 line 70). Using such a device to carbonate to currently acceptable levels would result in rapid venting of gas to the atmosphere, or excessively high pressures. Similarly in Hovey (U.S. Pat. No. 3,492,671—Jan., 1970), once again the reaction time is specified as two minutes (col. 1 line 41).

Referring now to Austin et al. (U.S. Pat. No. 4,040,342—Aug., 1977), the issue of operating pressure is specifically discussed and is of "the order of approximately 100 P.S.I." (col. 6 Line 29). Any excess pressure is vented by a relief valve. Once again chemical reaction is rapid and unregulated.

Shoaf et al. (U.S. Pat. No. 4,475,448—Oct., 1984) uses an unregulated reaction to develop "pressures of about 40 to 90 PSI" (Ref Col 6. line 37). Separation of reactants and beverage is achieved by a system of seals, bores and valves. This device is relatively complex when compared to the invention described herein. It also requires a certain amount of agility on behalf of the user if loss of carbon dioxide is to be avoided, as chemicals are mixed directly with water prior to sealing the chamber.

The essence of the invention described herein uses a simple technique to produce a greatly reduced rate of reaction and practically no foaming. It relies on the simple fact that while such chemicals will vigorously react with water, similar contact with ice promotes little or no reaction. That is until the ice gradually reverts to a liquid state.

Objects and Advantages

Accordingly, several objects and advantages of my invention are:

Additionally, Gupta et al. (U.S. Pat. No. 4,636,337—Jan., 1987) is similar to all previously discussed prior art in that it teaches the rapid carbonation of beverages in less than seven minutes with attendant high pressures. Gupta encloses the carbonating chemicals in a package for the purpose of providing a delay of at least ten seconds from immersion in water to the time when chemical reaction begins. This delay provides adequate time to seal the device before commencement of a vigorous and unregulated chemical reaction which generates pressures in excess of 90 PSI. Such a rapid rate of reaction also requires the venting of carbon dioxide to the atmosphere through a bleed line. This is to ensure a relative flow of gas through the beverage thus promoting an effective amount of carbonation in the short time available. As venting is continuous throughout the carbonation period, this is costly in the quantity of chemical consumed when compared to a sealed system.

The essence of the invention described herein uses a simple technique to produce a greatly reduced rate of reaction and practically no foaming. It relies on the simple fact that while such chemicals will vigorously react with water, similar contact with ice promotes little or no reaction. That is until the ice gradually reverts to a liquid state.

OBJECTS AND ADVANTAGES

Accordingly, several objects and advantages of my invention are:

To provide a device which will permit the carbonation of beverages using a chemical source of carbon dioxide at significantly lower pressures than evidenced in prior art. And to execute the carbonation process at pressures not significantly greater than the normal pressure required to simply sustain such a level of carbonation.

It is a further object of this invention to carbonate at a pressure low enough to permit a variety of beverage vessels, such as the disposable plastic soda bottle, to be safely used an indefinite number of times in the carbonation process.

It is a further object of this invention to substantially preclude the solid and liquid products of chemical reaction from entering the beverage to be carbonated.

It is a further object of this invention to permit carbonation to occur over a relatively long period of time thus ensuring that the beverage produced is fully stabilized, tranquil and cooled on completion of the carbonation cycle. Such a beverage may be considered as equivalent in quality to that now available commercially.

It is a further object of this invention to facilitate hygienic use of the apparatus by ensuring that the majority of the device is not immersed in the beverage to be carbonated.

It is a further object of this invention to make an effective home carbonation system which is simple enough to achieve the above mentioned objects and still capable of being marketed at a price attractive to all consumers of such beverages.

Further objects and advantages of my invention will become apparent from a consideration of the drawings and ensuing description.

DRAWING FIGURES

FIG. 4 is an illustration of another equally preferred embodiment of the invention.

FIG. 5 is a cross sectional elevation of the optional diffuser and non return valve unit.

FIG. 7 is a graphical representation of typical carbonator performance

REFERENCE NUMERALS IN DRAWINGS

| | |
|---|---|
| 10 | carbonation chamber |
| 12 | carbonator cap |
| 12T | tandem carbonator cap |
| 14 | pressure relief valve |
| 16 | beverage vessel |
| 18 | liquid level |
| 20 | ullage space |
| 22 | ice |
| 24 | Carbonating chemical |
| 26 | ullage space |
| 28 | maximum water level |
| 30 | conduit |
| 32 | thread |
| 34 | gas tight seal |
| 36 | pipe |
| 38 | gas diffuser |

| | |
|---|---|
| 40 | non return valve |

Description of Invention—FIGS. 1 to 6

Figure 1:
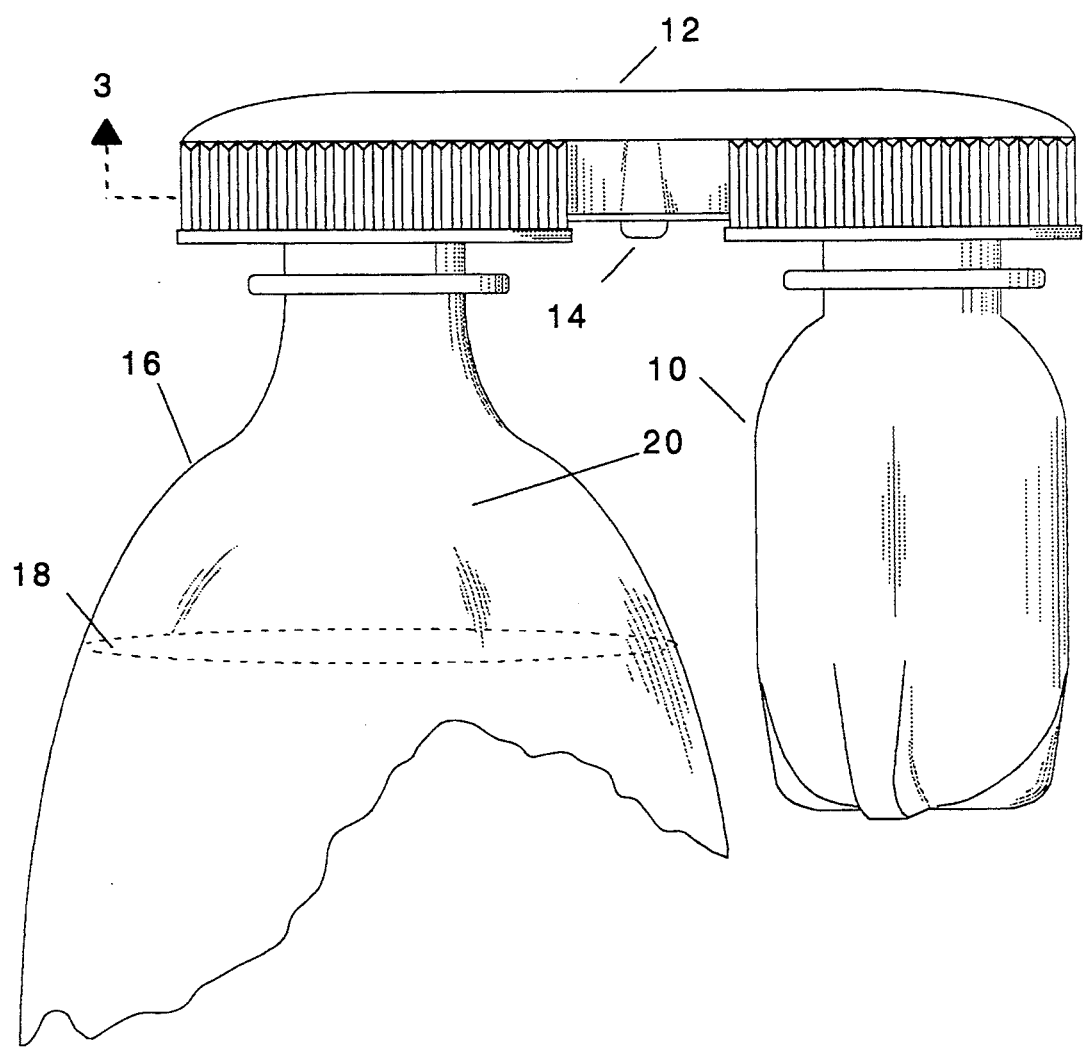
FIG. 1 illustrates in elevation, one equally preferred embodiment of the invention.

Referring first to FIG. 1 which illustrates an elevational view of the simplest embodiment of the apparatus affixed to a beverage vessel 16. Specifically, this illustration depicts a carbonation chamber 10 threadibly connected to a carbonator cap 12. Cap 12 is also threadibly connected to a beverage vessel 16.

Figure 2:
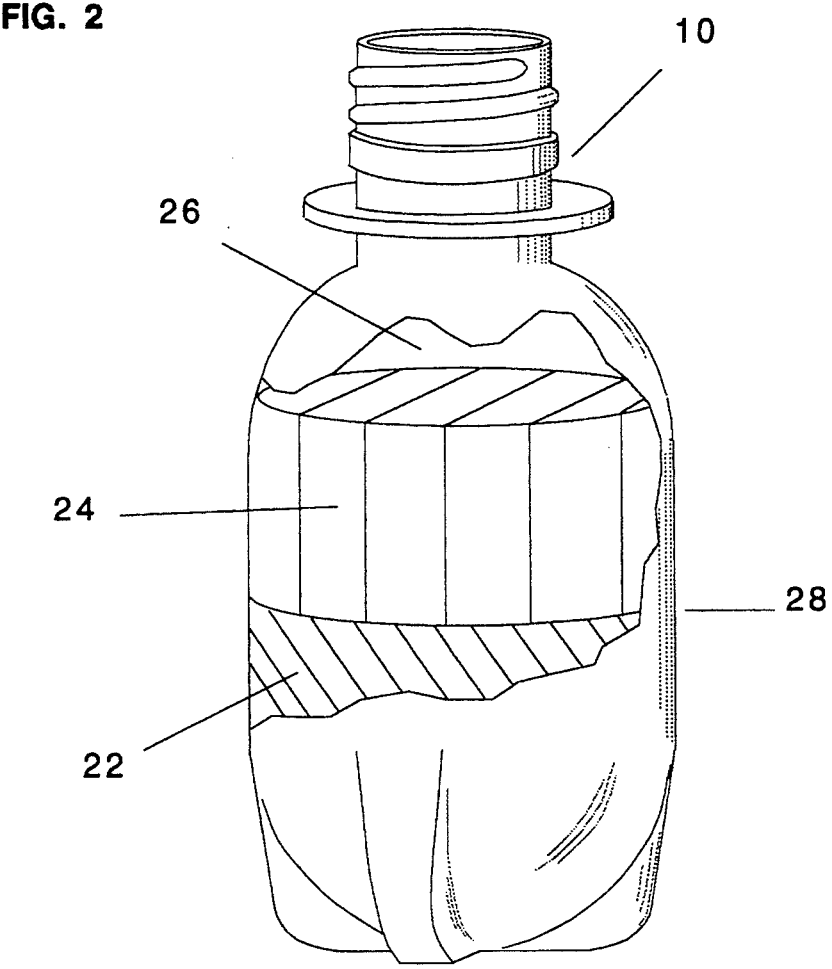
FIG. 2 illustrates in elevation, the carbonation chamber.

Now referring to FIG. 2 which illustrates an elevational schematic of a carbonation chamber 10. Chamber 10 is a vessel of suitable volume to contain both the ice 22, carbonating chemical 24 and a suitable ullage space 26. The carbonation chamber has a threaded neck which should be suitable to provide a gas tight seal with carbonator cap 12 at the pressures anticipated. It may be similar in construction to the standard soda bottle neck. As will become apparent in other sections of this text, the rate of chemical reaction is proportional to the speed at which the ice 22 is melted. Accordingly the thermal conductivity properties of the material used to manufacture the chamber will have an effect on the performance of the carbonator. In practice, a chamber of similar construction to that of a simple plastic beverage bottle is adequate to provide maximum carbonation pressures of around 50 P.S.I, when operated in a refrigerator or other frigid environment of approximately 5° celsius. If even lower pressures are desired, chamber 10 may be constructed of a suitable material having greater thermal insulating properties. As an optional matter of convenience the base of chamber 10 may be shaped to facilitate standing in a freezer compartment prior to use.

Still referring to FIG. 2, the volume of chamber 10 is now discussed. A level of carbonation approximating that of commercially available beverages may be achieved using 65 grammes of a chemical 24 such as citric acid and baking soda (in a molar ratio of 3:1). This quantity of chemical occupies a volume of approximately 50 ml. Using 50 ml of ice 22 and an ullage space 26 of 50 ml would require a minimum volume of 150 mi. The reaction may be successfully effected with less than 50 ml of ice 22. However such a volume facilitates rinsing of the chamber after use as a quantity of the sodium citrate produced will remain in solution. Similarly the volume of the ullage space 26 is simply a matter of preference and may be significantly reduced. As practically no foaming occurs during such a slow reaction, the primary purpose of space 26 is to ensure that chemical 24 and products of reaction are not carried over into the beverage should the device be tilted to significant angles during operation. It will be apparent to those skilled in the art that the smaller both these quantities are, the more efficient carbonator performance will be. The body of carbonation chamber 10 may be marked with a maximum water level 28.

The term chemical 24 or chemical couple herein used, is meant to include all combinations of non toxic chemicals which react with water to produce carbon dioxide, but do not react, to any great extent, with water when frozen. The term solid substance refers to ice in the preferred embodiment. Chemical 24 may be in either powder or pellet form. Powder form may be cheaper to manufacture, but pellet form is more easily handled by the consumer. If baking soda is heat treated to remove moisture, before mixing with citric acid it will maintain an adequate shelf life when marketed in hermetically sealed containers similar to that now used for numerous powdered beverage mixes.

Figure 3:
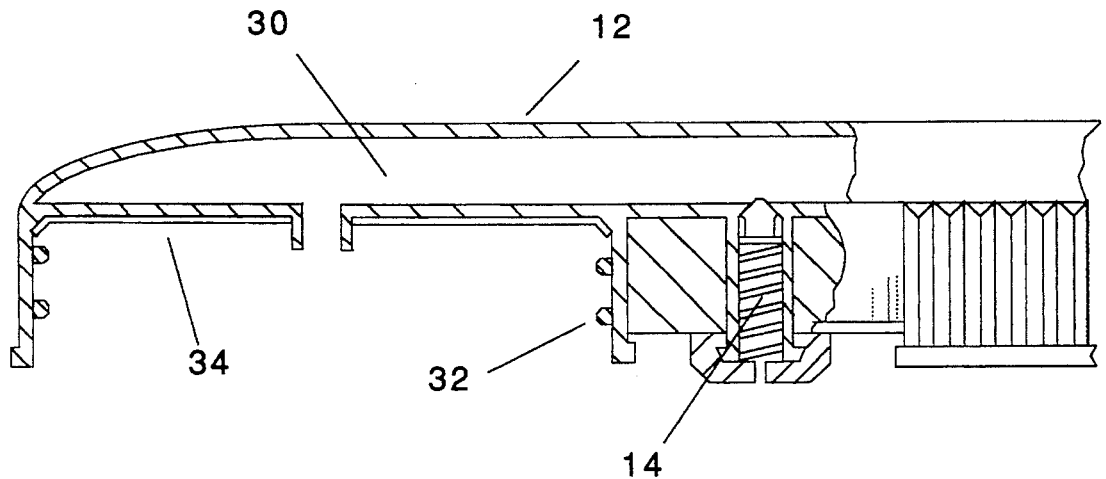
FIG. 3 is a partially schematic cross sectional elevation of the carbonation cap

Now referring to FIG. 3 which illustrates a cross sectional elevation of the carbonator cap 12, originally shown in FIG. 1. Cap 12 is primarily designed to fluidly couple carbonation chamber 10 to beverage bottle 16 in a gas tight environment at the pressures anticipated. A thread 32 and a sealing washer 34 provide a gas tight connection between the body of carbonator cap 12 and beverage vessel 16. An identical arrangement exists for gas tight connection of cap 12 to carbonation chamber 10. A gas tight conduit 30 connects both sealing arrangements. A pressure relief valve 14 may be placed in communication with conduit 30. Valve 14 is an optional safety device which will not be required to function under normal operating conditions. Cap 12, and its associated threads and seals may be constructed of similar materials and to similar tolerances used in present day soda bottle caps. However the structure should be sufficiently rigid to support the weight of both beverage vessel 16 and carbonation chamber 10 when subjected to normal handling during the carbonation process. The enclosed volume of cap 12 should be as small as possible to avoid wastage of carbon dioxide.

Now referring to FIG. 1, beverage vessel 16 may be any suitable containment device capable of resisting the pressure anticipated and having sufficient interface between liquid and carbon dioxide contained within the ullage space to promote low pressure carbonation. The preferred embodiment illustrates use of a two liter plastic beverage bottle now in common usage. The beverage vessel 16 is filled to level 18 with the beverage to be carbonated thus ensuring an ullage space is preserved. In the standard two liter beverage bottle the level indicated would approximate to two liters of beverage providing an ullage space of about 250 ml. This embodiment has the advantage of being the simplest and therefore the cheapest to manufacture.

Referring now to FIG. 4 which illustrates an optional modification to the original embodiment. That is the inclusion of a gas diffuser arrangement to increase the rate of carbon dioxide absorption of the liquid to be carbonated. It will be apparent to those skilled in the art that such a device will also further lower the operating pressure of the embodiment illustrated in FIG. 1. A pipe 36 is connected to carbonator cap 12 so that the carbon dioxide stream will be conducted to a level below the surface of the beverage to be carbonated. Referring now to FIG. 5 which illustrates a cross sectional view of optional diffuser block 38 and a non return valve 40, connected in a gas tight manner to pipe 36. The gas stream will be directed through this arrangement to the beverage to be carbonated. Liquid back flow during decompression of the system is avoided by the action of valve 40.

Figure 6:
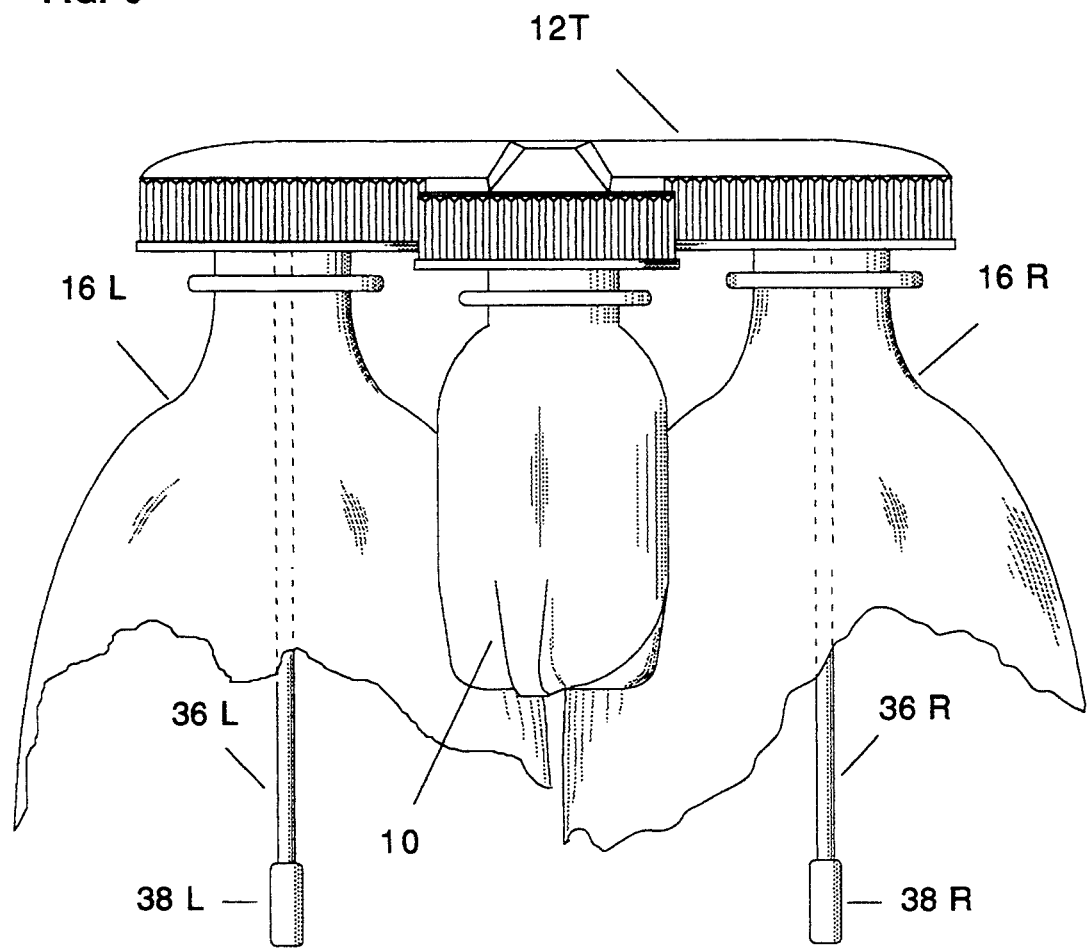
FIG. 6 illustrates in elevation, an equally preferred embodiment of the invention

Now referring to FIG. 6 which illustrates, in elevation a further and equally preferred embodiment of the invention. This embodiment is more complex than those previously described, but has the advantage of permitting carbonation of a greater quantity of beverage per carbonation cycle.

The design of Carbonation cap 12T is modified from that previously described to permit two beverage vessels 16L and 16R to be connected in a gas tight environment with carbonation chamber 10. The pipe 36, non return valve 40 and diffuser unit 38 illustrated and described in FIGS. 4 and 5 are incorporated into this design.

Operation of Invention FIGS. 1-7

It is anticipated that the carbonation device described herein may be offered for sale with two carbonation chambers 10 so that one is always readily available in the frozen condition. On initial purchase the consumer will be advised to fill both chambers 10 with water to the level indicated 28 and place them in the freezer compartment of a refrigerator. After a period of time, both chambers will be frozen ensuring that at least one chamber will always be available for future use.

The following description relates to the embodiment illustrated in FIGS. 1 and 2. A suitable beverage container 16 is obtained. For the purposes of this description it will be assumed that the container is a standard plastic, two liter soda bottle now in common usage. Container 16 is filled with the beverage to be carbonated to a level 18 which is at least 3 inches from the top of the bottle. This ensures that the ullage space 20 is preserved, which is necessary for low pressure carbonation. A beverage at normal room temperature may be used.

Bottle 16 is placed on a level surface and carbonator cap 12 is threaded on to the bottle neck and lightly tightened. That is, tightened in such a manner that a gas tight seal may be achieved in about one further revolution. A carbonation chamber 10 is retrieved from the freezer compartment and placed on a level surface. The prescribed quantity of carbonating chemical 24, in either powder or pellet form is placed into the chamber 10. If powder is used, a small scoop and funnel may be provided to facilitate this operation. At this time very little reaction will be visible to the naked eye. The small amount of carbon dioxide generated at the interface between ice 22 and chemical 24 will serve to partially purge the ullage space 26 of atmospheric gasses. The chamber 10 is firmly threaded into the carbonator cap 12 ensuring a gas tight seal.

Although the various components of the device are now assembled as illustrated in FIG. 1, the system is not yet totally sealed as a gas tight connection has yet to be made between Cap 12, and bottle 16. The bottle 16 is gently squeezed until beverage level 18 rises to the neck of the bottle. Carbonator cap 12 is then firmly tightened to bottle 16 ensuring a gas tight seal. The purpose of this action is to substantially purge the system of atmospheric gasses contained within ullage space 20 as such gasses do not contribute to the carbonation process. The manual effort required to provide a gas tight seal at the working pressures anticipated is somewhat similar to that required to effectively seal an ordinary bottle of soda.

The fluidly coupled combination is then placed in a refrigerator in the upright position as illustrated in FIG. 1 for a period of time. The soda bottle 16 will gradually regain shape under the pressure of carbon dioxide generated within the system. Tests have revealed that a satisfactory level of carbonation may be achieved after approximately 12 hours. However as the temperature of individual consumers refrigerators cannot be predicted with any certainty, specifying a carbonation duration of up to 24 hours should ensure effective utilization of all carbonation chemical without inconvenience to most consumers. Particularly when consideration is given to the relatively large amount of beverage produced during each carbonation cycle.

A typical operating environment may consist of a refrigerator at 5° celsius. Ice 22 may be frozen to approximately $-10°$ celsius and the chemical 24 would normally be at room temperature. In the initial stages of carbonation the latent heat of fusion required to gradually cause the ice 22 to melt is initially obtained from both the refrigerator environment and the chemical 24. As the chemical 22 is cooled to temperatures approaching that of the ice, the major source of heat energy is obtained from the refrigerator environment. Once the ice has started to melt the generation of carbon dioxide will gradually commence. The gas is conducted from chamber 10 through cap 12 into the ullage space of bottle 16. As a result of the purging process described previously ullage 16 will be filled predominantly with a carbon dioxide atmosphere facilitating absorption of carbon dioxide through the interface at beverage level 18. In the embodiment of the invention described in FIG. 4, absorption is assisted by the injection of carbon dioxide through a diffuser below beverage level 18.

It is readily apparent to one skilled in the art, that the thermal conductivity properties of the carbonation chamber 10 will effect the rate of reaction. By way of example FIG. 7 illustrates an approximate pressure performance curve for the carbonator embodiment illustrated in FIG. 4 with a simple chamber 10 constructed of a similar material to that of the standard plastic soda bottle.

After the prescribed period of time the device is removed from the refrigerator and placed on a level surface. Carbonation chamber 10 is removed from the carbonator cap 12 and rinsed with tap water to remove the products of reaction. The chamber is then once again filled with water to the prescribed level 28 and returned to the freezer compartment. Carbonator cap 12 is removed from bottle 16. As a result of the relatively long carbonation period, the beverage is now chilled, in a tranquil state, and ready for immediate consumption. The bottle 16 may be sealed with the original soda bottle cap and consumed at leisure. In the embodiments illustrated in FIGS. 4 & 6 it is important that chamber 10 is removed from carbonator cap 12 before removal of bottle 16. If bottle 16 is removed first, a pressurized gas stream will flow into the bottle 16 from chamber 10 causing agitation and foaming of the beverage. If chamber 10 is first removed, liquid back flow through diffuser 38 will be prevented by non return valve 40.

Referring now to FIG. 6, the operation of this embodiment is slightly different to that previously described. Two bottles are filled with beverage in the manner previously described and placed on a level surface. Carbonator cap 12T is inserted into both bottles as illustrated. Both bottles are rotated, in turn, to threadibly connect to cap 12 without making a gas tight seal. A carbonation chamber 10 is retrieved from the freezer and charged with a measured quantity of chemical 24, as previously described. Chamber 10 is firmly threaded into cap 12T making a gas tight seal. Bottle 16L is gently squeezed until the beverage level rises to the bottle neck thus purging atmospheric gasses from the system. Bottle 16L is then further rotated in relation to cap 12T to produce a gas tight seal. The purging procedure is repeated for bottle 16R and the device is placed in a refrigerator.

After the prescribed period of time has elapsed, the device is removed from the refrigerator and placed on a level surface. Chamber 10 is unscrewed thus depressurizing both chamber 10 and cap 12T. Bottles 16L and 16R remain pressurized as a result of the action of non return valves 40L and 40R. Both bottles may then be unscrewed from carbonator cap 12T and resealed with the original soda bottle caps.

Thus the reader will see that the invention described herein provides an economical, effective and environmentally friendly means for the consumer to produce carbonated beverages at home. While the above description contains many specifities, these should not be construed as limitations on the scope of the invention, but rather as an exemplification of the preferred embodiments thereof.

Many other variations are possible. For example the embodiment shown prefers carbonation using a beverage vessel in the less efficient vertical orientation. Such an embodiment is simple and occupies minimum space in the consumers refrigerator. It is appreciated that numerous options exist in prior art for increasing the efficiency of carbon dioxide absorption and thereby the overall performance of the system. The simple expedient of carbonating vessel 16 in the horizontal position would increase the beverage/ullage interface and therefore the rate of carbon dioxide absorption. By way of further example, a vertically orientated inductor shroud could be place around pipe 36 to promote liquid mixing currents induced by the bubble stream. Similarly a series of horizontal disks could emanate radially from pipe 36 providing a vertical cascade bubble trap for the gas stream, increasing absorption efficiencies. Many similar ramifications have been excluded from this text to preserve the simplicity of the apparatus herein described.

For environmental reasons the embodiment shown favors use of the standard two liter plastic beverage bottle now in common usage. Though commonly available this is not the most efficient vessel in which to carbonate beverages. For example, a soda bottle which has a more bulbous horizontal cross section coincident with beverage level 18 would greatly increase the liquid surface area exposed to carbon dioxide. The carbonator described herein could be effectively used to carbonate smaller or larger quantities of beverage than evidenced in the embodiments shown. By way of example, some rudimentary design changes to the common 2.5 gallon water container to permit attachment of a reusable carbonation chamber and soda siphon type dispenser would produce a relatively cheap supply of seltzer water.

Accordingly, the scope of the invention should be determined not by the embodiments illustrated, but by the appended claims and their legal equivalents.

I claim:

1. A method of carbonating a volume of beverage from a chemical source of carbon dioxide, comprising the steps of:
    (a) filling a beverage vessel with said volume of beverage smaller than the volume of the vessel thereby defining an ullage space when the beverage is placed in the vessel, and
    (b) placing in a carbonation chamber an adequate quantity of said chemical and ice to provide the level of carbonation required, and
    (c) substantially purging atmospheric gasses from said ullage space, and
    (d) fluidly coupling said carbonation chamber with said beverage vessel, and
    (e) placing the fluidly coupled combination into a frigid environment greater than 0° celsius so that said ice will gradually melt thereby causing the generation of carbon dioxide to persist for at least 12 hours whereby a level of carbonation may be achieved at a pressure not significantly greater than the pressure required to sustain said level of carbonation.

* * * * *